US006324998B1

(12) United States Patent
Alden et al.

(10) Patent No.: US 6,324,998 B1
(45) Date of Patent: Dec. 4, 2001

(54) END CAP BAR FOR BARBEQUE GRILL CART

(75) Inventors: J. Michael Alden, Palatine; Mark Johnson, Wilmette, both of IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

(21) Appl. No.: 09/374,543

(22) Filed: Aug. 13, 1999

(51) Int. Cl.⁷ .................................................. A47B 13/08
(52) U.S. Cl. .............................................................. 108/90
(58) Field of Search ............................... 108/90, 27, 180, 108/191, 161; 312/140.4; 288/345.1; 126/41 R, 25 R, 9 R, 9 B

(56) References Cited

U.S. PATENT DOCUMENTS

| D. 298,406 | 11/1988 | Stephen et al. . | |
|---|---|---|---|
| 2,541,528 | 2/1951 | McAvoy . | |
| 2,642,326 | * 6/1953 | Taylor | 108/27 |
| 3,230,948 | 1/1966 | Schmidt . | |
| 4,630,550 | * 12/1986 | Weitzman | 108/180 X |
| 4,677,964 | 7/1987 | Lohmeyer et al. . | |
| 4,688,541 | 8/1987 | Stephen et al. . | |
| 4,886,045 | 12/1989 | Ducate, Jr. et al. . | |
| 5,018,628 | * 5/1991 | Schenck et al. | 108/27 X |
| 5,279,277 | 1/1994 | Barker . | |
| 5,341,793 | 8/1994 | Brown . | |
| 5,411,011 | 5/1995 | Teta . | |
| 5,941,229 | 8/1999 | Schlosser et al. . | |

FOREIGN PATENT DOCUMENTS

32881 * 11/1962 (FI) ......................................... 108/27

* cited by examiner

Primary Examiner—Jose V. Chen
(74) Attorney, Agent, or Firm—Wallenstein & Wagner, Ltd.

(57) ABSTRACT

An end bar for a barbeque grill cart is disclosed. The end bar is attached to a barbeque grill cart having a frame formed of a plurality of frame members, each of the frame members having a frame member wall defining an interior space with an interior dimension and having an open end, one open end of one of the frame members being in spaced adjacent relation to the open end of at least another of the frame members. The end cap has a bridging member and at least two projecting members, each with an outer dimension adapted to be received within the interior space of at least two of the frame members. The end bar optionally includes a pivot port for a pivot pin such that a folding shelf may be mounted. Alternatively, the end bar may include utensil mounting projections for hanging cooking utensils.

20 Claims, 3 Drawing Sheets

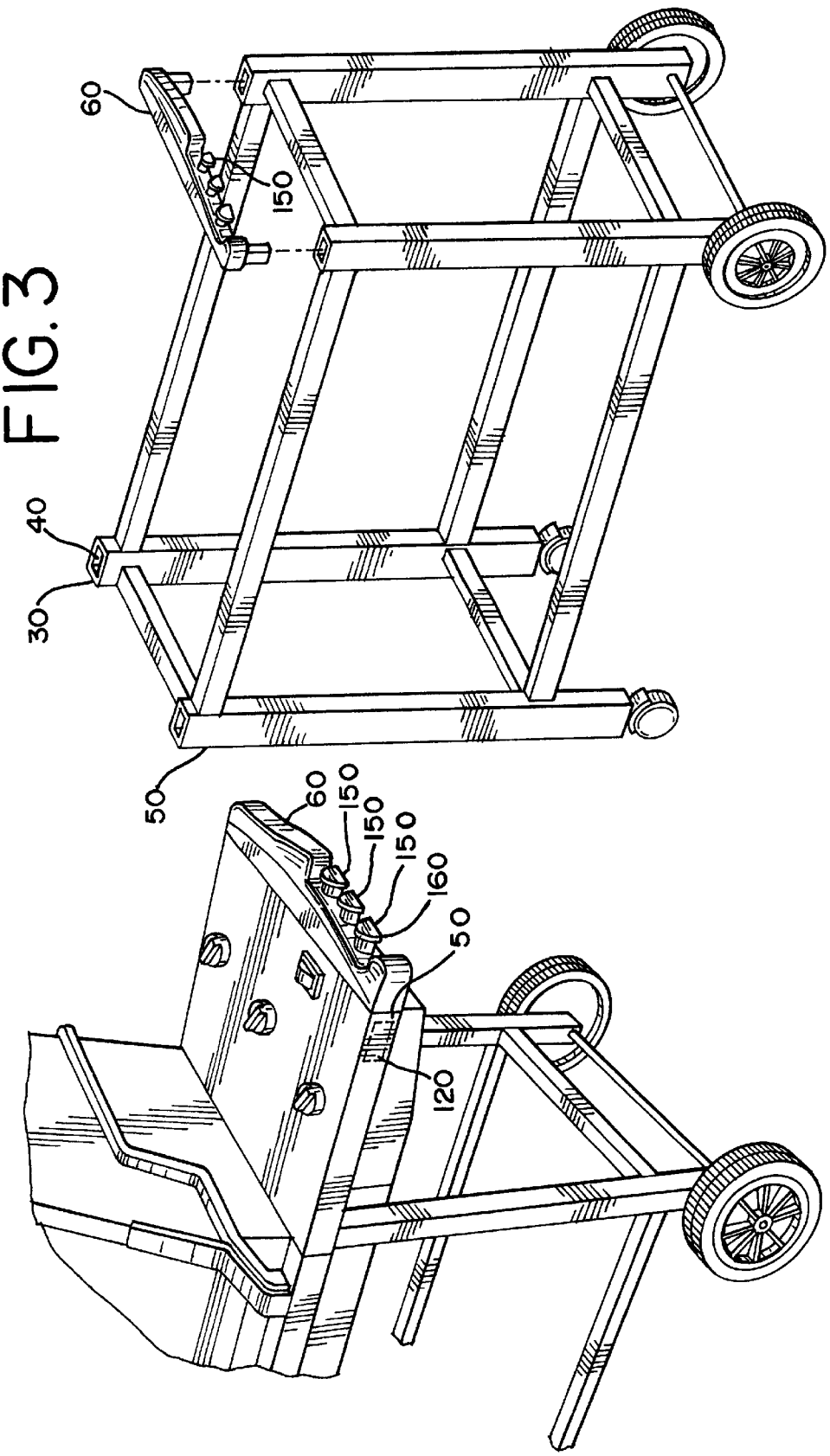

END CAP BAR FOR BARBEQUE GRILL CART

TECHNICAL FIELD

The present invention relates generally to barbeque grill carts, and, more particularly to an end cap bar which attaches to the frame members of a barbeque grill cart.

BACKGROUND OF THE INVENTION

Barbeque grills have become very popular as outdoor cooking devices. Typical grills, particularly gas grills, are supported by a barbeque grill cart. These carts are formed using a plurality of frame members and/or sheet metal panels. The frame members are often tubular metal supports aligned in a grid-like structure of vertical and horizontal bars. Thus, cross bars are mounted to support parallel frame members.

The ends of the frame members are usually closed with conventional plastic end caps. One of the problems with such grill carts is the difficulty for the purchaser to assemble side accessories. Such assembly may involve following detailed instructions and packaging of numerous parts. Attachments to such grill carts are generally added using additional hardware for mountings, adding expense and extra parts to the construction of such a cart. It is preferable to keep parts to a minimum in order to allow for compact packaging for shipping. There is, therefore, a need for a barbeque grill cart having a convenient way of mounting an end bar which closes off the ends of the frame members and provides support to the cart structure. Furthermore, there is a need for an end bar assembly which provides for convenient addition of accessories.

SUMMARY OF THE INVENTION

According to the present invention, a new end bar has been developed to attach to the end of a barbeque grill cart by mating receiver and projection securement between the end bar and the cart frame members. This end bar provides a convenient way to close the ends of the frame members of the cart while providing support and stability to the structure of the cart frame. The end bar serves to also enable the elimination of a support bar in the frame of the cart, thus reducing the number of parts in the construction. The end bar further provides a convenient manner of adding a handle or decorative end to the cart without the addition of further mounting hardware.

According to one aspect of the invention, the end bar is provided with a pivot port adapted to receive a pivot pin or pivot assembly of a pivotally mounted shelf. Such a shelf could optionally be one described in copending, commonly assigned U.S. application Ser. No. 09/374,821 (filed using Application Identifier 217 P708) filed Aug. 13, 1999, which is hereby incorporated by reference in its entirety.

According to another aspect of the invention, the end bar is spaced from the cart frame and formed to provide a handle, such as one which could be used to move the cart.

According to a further aspect of the invention, the end bar is provided with utensil holders on an outer side of the end bar for conveniently hanging barbeque utensils.

Other features and advantages of the invention will be apparent from the following specification taken in conjunction with the following drawings.

BRIEF DESCRIPTION OF THE DRAWINGS

FIG. 2 is a perspective view of a grill cart employing another embodiment of the end bar of the present invention.

FIG. 3 is perspective, exploded view of a grill cart showing an end bar of the present invention mounted to vertical frame members.

DETAILED DESCRIPTION OF THE PREFERRED EMBODIMENT

Figure 1:
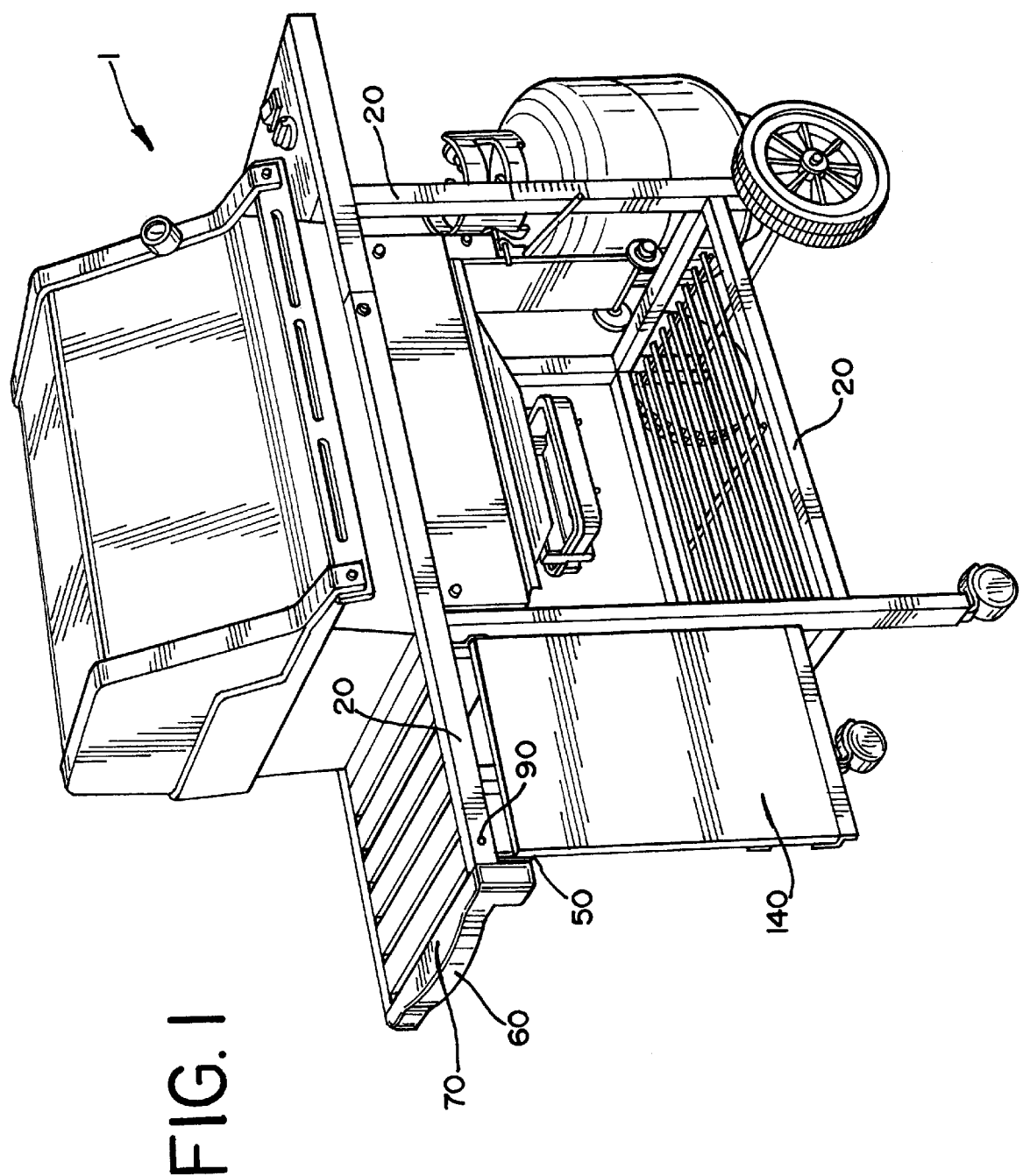
FIG. 1 is a perspective view of a barbeque grill cart employing the end bar of the present invention with a pivotally mounted shelf attached thereto.
Figure 4:
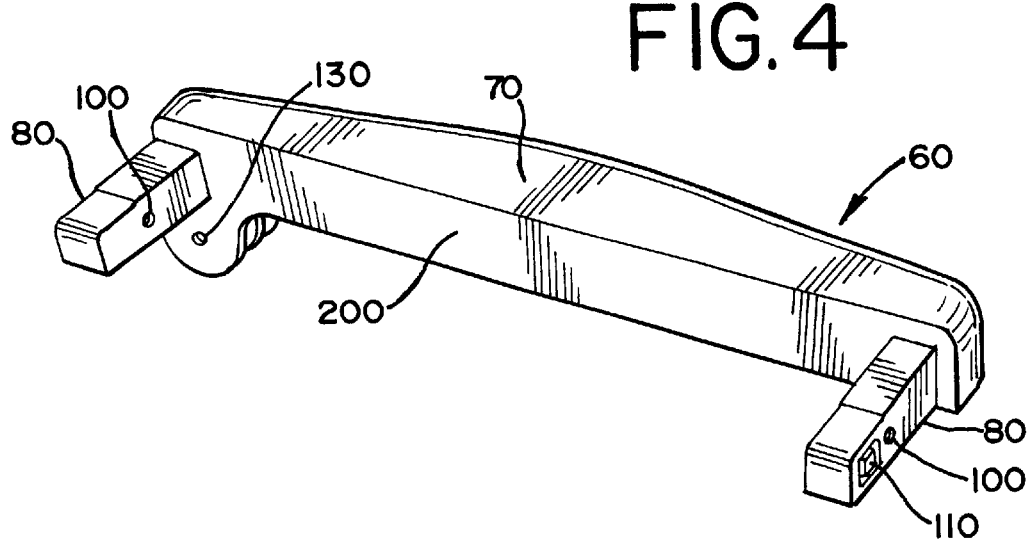
FIG. 4 is a perspective view of one embodiment of the end bar of the present invention.
Figure 5:
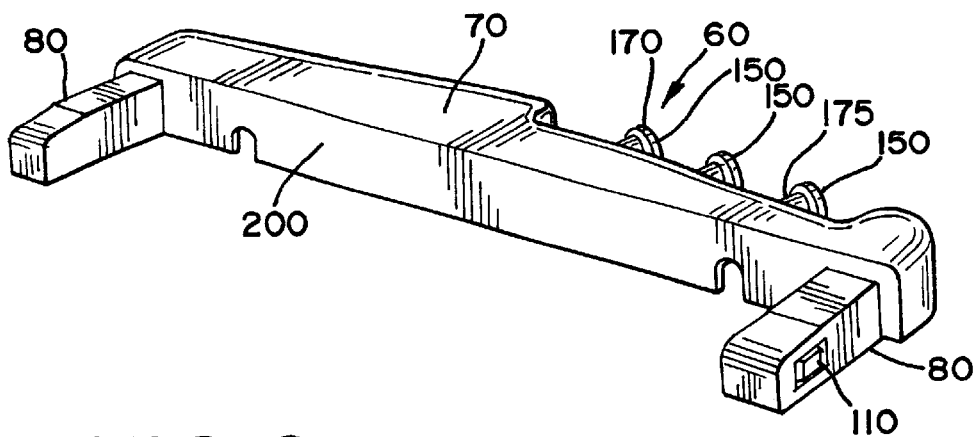
FIG. 5 is a perspective view of another embodiment of the end bar of the present invention.
Figure 6:
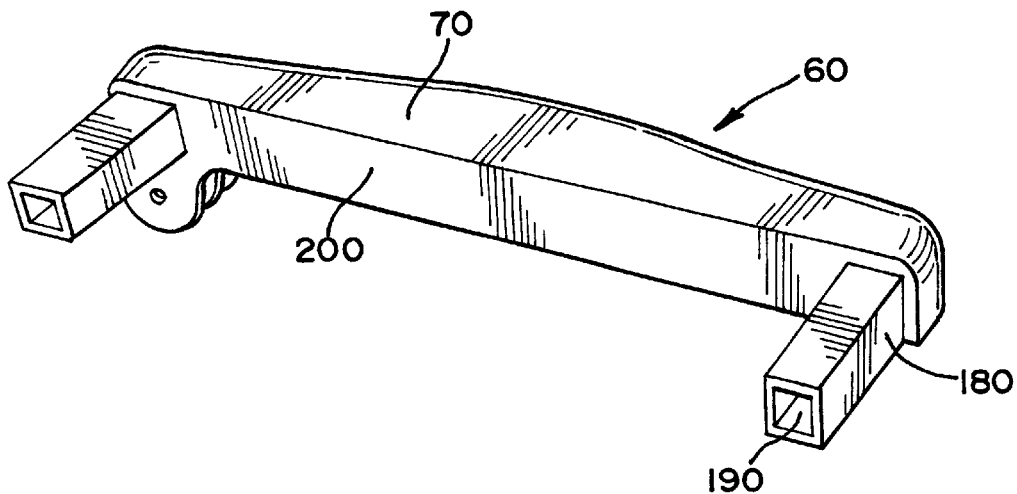
FIG. 6 is a perspective view of a further embodiment of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 shows a barbeque grill cart 10 comprising a frame formed of a plurality of frame members 20, each of the frame members 20 having a frame member wall 30 (FIG. 3) defining an interior space 40 with an interior dimension and having an open end 50, one open end 50 of one of the frame members 20 being in spaced adjacent relation to the open end 50 of at least another frame member 20. The frame members 20 are mounted in a grid-like structure to form the cart 10. The frame members 20 are preferably tubular bars formed of one continuous side wall 30 having a substantially rectangular interior portion, for example. Alternatively, the frame members 20 of the cart 10 may be made up of any combination of tubular members, U-shaped members, or sheet-stock metal being bent to form frame members. Such alternative frame members thereby have a free end area that forms open ends 50 having at least a partially continuous side wall adapted for insertion of an end bar 60 of the present invention to be received into the free ends 50. Alternatively, as disclosed herein, the end member bar member 60 may have the ends 50 received within a passageway.

The end bar 60 is preferably formed of molded plastic material for ease of manufacture and versatility of design features. Alternatively, the end bar 60 may be formed of metal, such as would be useful for supporting the barbeque grill on the end bar 60.

In one embodiment, an end bar 60 has a bridging member 70 and at least two projecting members 80 extending from a side surface 200, each with an outer dimension adapted to be received within the interior space 40 of at least two of the frame members 20. The bridging member 70 is preferably an elongated body extending along an axis and the projecting members 80 extend transversely to the axis, preferably parallel to one another. The projection members 80 extend a length great enough to enable the end bar 60 to be sufficiently supported by the frame members 20. A length in the range of 1–4 inches is preferable, for example, the projection members may extend approximately 3.5 inches from the side surface such that a sufficient amount of the projection members 80 may be inserted into the frame members 20.

The projection members 80 preferably are formed of segmented sidewalls, taking any of a number of shapes, such as curvalinear, round, square, rectangular, etc. Preferably, the shape matches the interior geometry of the frame members 20. The sidewalls, and any segments of the sidewalls, are dimensioned such that they fit snugly with the mating surface of the receiving portion of the frame members 20. The projection members 80 may have a tapered end to facilitate installation. The projection members 80 may also optionally be formed such that they are hollowed out, and may include cross-member walls for added rigidity.

The bridging member 70 is preferably formed with a hollowed-out underside which may be supported by cross-member walls for added rigidity as well. The side surface 200 is preferably shaped to fit flush against a surface along the side of the cart, preferably a flat surface.

In a preferred embodiment, one or both of the projecting members 80 are secured to the ends 50 of the frame members by a fastener 90 extending through the side wall 30 of the frame member 20. The fastener 90 is preferably received by a receiving port 100 of the projection member 80. The receiving port 100 preferably contains threading adapted to receive the fastener 90, or any suitable alternative engaging surface of the frame member 20. The projection members 80 may also include a recessed portion for receiving a projecting portion on the inside of the frame members 20.

In another preferred embodiment, the projection members 80 have a deformable projection, such as spring clips 110 which are adapted to engage recesses 120) in the frame members 20.

In another preferred embodiment, the bridging member 70 of the end bar 60 is placed in spaced relation to a side surface of the grill cart 10 such that the end bar 60 forms a convenient handle. The end bar 60 also optionally includes a pivot port 130 adapted to receive a pivot assembly of a pivotally mounted shelf 140. Such a shelf 140 may be mounted to fold down and out of the way when not in use.

In a further preferred embodiment, the end bar 60 comprises utensil mounting members 150 for hanging cooking utensils. Such mounting members 150 extend from an outside wall 160 of the end bar 60, and terminate with a lip 170 adapted to maintain a hanging utensil in place. A depression 175 may be provided in order to seat the hanging utensil.

In an alternate embodiment, the end bar 60 has mating members 180 which have an interior receiving space 190 adapted to receive the ends of the frame members 20. Any combination of elements is contemplated, including the end bar 60 having one projecting member 80 and one receiving member 180, etc. The present invention, therefore, provides securement of an end cap bar 60 by mating components of a receiver and a projection. In one preferred embodiment shown herein, the projection is preferably formed as an extending projection member 80 of the end bar 60, and the receiver is a comparably dimensioned passageway in the cart 10. In this preferred embodiment, the passageway is defined by at least one opening in a tubular frame member 20. In an alternative arrangement, the projection may be an extension. of the cart 10, and the receiver is thereby a receiving space 190 dimensionally adapted to fit the outer dimension of the projection of the cart 10.

As the end bar 60 provides a convenient manner of attaching a handle and providing support to a grill cart, the end bar may be configured so as to mount to horizontal frame members 20. Alternatively, the end bar may be configured so as to mount to vertical frame members 20 as shown in FIG. 3.

While the specific embodiments have been illustrated and described, numerous modifications come to mind without significantly departing from the spirit of the invention, and the scope of protection is only limited by the scope of the accompanying claims.

What is claimed is:

1. A barbeque grill cart comprising:
   a frame formed of a plurality of frame members at least two frame members having a frame member wall defining an interior space with an interior dimension and having an open end, one open end of a first frame member being in spaced adjacent relation to the open end of at least a second frame member,
   an end cap bar having abridging member and at least two projecting members, a first projecting member having an outer dimension adapted to be received within said interior space of said first frame member, and a second projecting member having an outer dimension adapted to be received within said interior space of said second frame member, the bridging member having at least one mounting member for providing support for utensils.

2. The barbeque grill cart according to claim 1, wherein the at least one of the projecting members is secured in one of said open end a fastener extending through a side wall of the open end and through a receiving port of the projection member.

3. The barbeque grill cart according to claim 2, wherein the fastener is received by threading in the receiving port.

4. The barbeque grill cart according to claim 1, wherein at least one of the projection members further comprises a spring clip adapted to engage a recess formed in the open end of a corresponding one of said frame members.

5. The barbeque grill cart according to claim 1, wherein the bridging member is in spaced relation to a side of the cart and adapted form a handle at the side of said cart.

6. The barbeque grill cart according to claim 1, wherein the bridging member further comprises a pivot port for receiving a pivot assembly of an auxiliary shelf to support at least a portion of said shelf.

7. The barbeque grill cart according to claim 6, wherein said shelf is pivotally mounted by a pivot pin received in the pivot port of the bridging member.

8. The barbeque grill cart according to claim 1, wherein said mounting members extend from an outside wall of said bridging member.

9. The barbeque grill cart according to claim 1, wherein said mounting members further comprise a shaft having a lip adapted to maintain a utensil mounted using a loop of material placed over the shaft.

10. A barbeque grill cart comprising:
    a frame formed of a plurality of frame members, at least two framemember having of said frame member being in spaced adjacent relation to a second end of another of said frame members,
    an end cap bar, having a bridging member and a first receiving member with an inner dimension adapted to receive at least one of said ends of said frame members, and a second receiving member with an inner dimension adapted to receive at least another end of said frame members, the bridging member having mounting members for providing support for utensils.

11. An end bar for a barbeque grill cart comprising:
    an elongated bridging member having a side surface, the bridging member further comprising at least one utensil mounting member projecting from an outer surface of the bridging member;
    at lease two mating member extending from the side surface adapted to engage at least two corresponding ends of respective cart frame members.

12. An end bar according to claim 11, wherein at least one of said mating members is a projection member adapted to be received by a receiving portion of a corresponding one of said frame members.

13. An end bar according to claim 12, wherein the projection member has a threaded bore formed therein adapted to align with a bore in one of said frame members and to receive a fastener for securing said one of said frame members to the projection member.

14. An end bar according to claim 12, wherein said projection member further comprises a spring clip in a side surface thereof adapted to engage a recess formed in the corresponding one of said frame members.

15. An end bar according to claim 11, wherein at least one of said mating members is a receiving member having an interior space adapted to receive a corresponding one of said frame members.

16. An end bar according to claim 11, wherein the bridging member further comprises a pivot port adapted to receive a pivot pin for mounting an accessory.

17. An end bar according to claim 11, wherein said mounting member comprises a shaft having a lip adapted to maintain a utensil mounted using a loop of material placed over the shaft.

18. A barbeque grill cart according to claim 1, wherein said plurality of frame members are tubular members formed of a continuous side wall.

19. A barbeque grill cart according to claim 1, wherein said at least two of said frame members are horizontal frame members.

20. A barbeque grill cart according to claim 1, wherein said at least two of said frame members are vertical frame members.

* * * * *